(12) United States Patent
Cho et al.

(10) Patent No.: US 7,483,212 B2
(45) Date of Patent: Jan. 27, 2009

(54) OPTICAL THIN FILM, SEMICONDUCTOR LIGHT EMITTING DEVICE HAVING THE SAME AND METHODS OF FABRICATING THE SAME

(75) Inventors: Jae-hee Cho, Yongin-si (KR); Frank Wilhelm Mont, Troy, NY (US); Cheol-soo Sone, Yongin-si (KR); Jong-kyu Kim, Troy, NY (US); June-o Song, Yongin-si (KR); E. Fred Schubert, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 6 days.

(21) Appl. No.: 11/657,648

(22) Filed: Jan. 25, 2007

(65) Prior Publication Data

US 2008/0088932 A1    Apr. 17, 2008

Related U.S. Application Data

(60) Provisional application No. 60/850,657, filed on Oct. 11, 2006.

(51) Int. Cl.
 *G02B 1/10*    (2006.01)
(52) U.S. Cl. .................... 359/586; 359/582
(58) Field of Classification Search ............. 359/586
 See application file for complete search history.

(56) References Cited

U.S. PATENT DOCUMENTS 4,184,171 A * 1/1980 Panish ................. 372/45.01
4,772,934 A   9/1988 Cunningham et al.

(Continued)

FOREIGN PATENT DOCUMENTS

KR    10-2006-0014383    2/2006

OTHER PUBLICATIONS

Chu et al., "Study of GaN light-emitting diodes fabricated by laser lift-off techniique", J. Appl. Phys., vol. 95, No. 8, pp. 3916-3922 (Apr. 15, 2004).

(Continued)

*Primary Examiner*—Joshua L Pritchett
(74) *Attorney, Agent, or Firm*—Harness, Dickey & Pierce, P.L.C.

(57) ABSTRACT

Provided are a highly transmissive optical thin film having an improved structure, in which, optical reflection (due to a difference in the refractive index between a semiconductor material and the air, when light is extracted from a semiconductor light emitting device into the air) may be suppressed, an optical output loss may be reduced and light transmittance efficiency may be maximized or increased, a semiconductor light emitting device having the same, and methods of fabricating the same. The optical thin film may include a first material layer having a first refractive index, a second material layer formed on the first material layer and having a second refractive index that is smaller than the first refractive index, and a graded-refractive index layer interposed or inserted between the first material layer and the second material layer and having a multi-layer structure in which refractive index distribution gradually decreases in the range between the first refractive index and the second refractive index as the refractive index distribution progresses from the first material layer toward the second material layer.

14 Claims, 9 Drawing Sheets

U.S. PATENT DOCUMENTS

| | | | |
|---|---|---|---|
| 4,780,748 | A | 10/1988 | Cunningham et al. |
| 4,784,967 | A | 11/1988 | Cunningham et al. |
| 4,882,609 | A | 11/1989 | Schubert et al. |
| 4,929,064 | A | 5/1990 | Schubert |
| 4,974,044 | A | 11/1990 | Cunningham et al. |
| 4,980,892 | A | 12/1990 | Cunningham et al. |
| 5,018,157 | A | 5/1991 | Deppe et al. |
| 5,024,967 | A | 6/1991 | Kopf et al. |
| 5,031,012 | A | 7/1991 | Cunningham et al. |
| 5,068,868 | A | 11/1991 | Deppe et al. |
| 5,115,441 | A | 5/1992 | Kopf et al. |
| 5,170,407 | A | 12/1992 | Schubert et al. |
| 5,206,871 | A | 4/1993 | Deppe et al. |
| 5,226,053 | A | 7/1993 | Cho et al. |
| 5,226,055 | A | 7/1993 | Downey et al. |
| 5,249,195 | A | 9/1993 | Feldman et al. |
| 5,268,582 | A | 12/1993 | Kopf et al. |
| 5,315,128 | A | 5/1994 | Hunt et al. |
| 5,362,977 | A | 11/1994 | Hunt et al. |
| 5,363,398 | A | 11/1994 | Glass et al. |
| 5,451,548 | A | 9/1995 | Hunt et al. |
| 5,550,089 | A | 8/1996 | Dutta et al. |
| 5,719,077 | A | 2/1998 | Chakrabarti et al. |
| 5,932,899 | A | 8/1999 | Schubert |
| 5,955,749 | A | 9/1999 | Joannopoulos et al. |
| 6,294,475 | B1 | 9/2001 | Schubert et al. |
| 6,552,367 | B1 | 4/2003 | Hsieh et al. |
| 6,552,369 | B2 | 4/2003 | Chiou et al. |
| 6,784,462 | B2 | 8/2004 | Schubert |
| 2004/0155154 | A1* | 8/2004 | Topping .................. 244/158 R |
| 2006/0170335 | A1 | 8/2006 | Cho et al. |
| 2007/0029561 | A1 | 2/2007 | Cho et al. |
| 2007/0030611 | A1 | 2/2007 | Cho et al. |
| 2007/0116966 | A1* | 5/2007 | Mellott et al. ............... 428/432 |

OTHER PUBLICATIONS

Chu et al., "Effects of Different n-Electrode Patterns on Optical Characteristics of Large-Area p-Side-Down InGaN Light-Emitting Diodes Fabricated by Laser Lift-Off", Japanese J. of Appl. Phys., vol. 44, No. 11, pp. 7910-7912 (2005).

Fujii et al., "Increase in the extraction efficiency of GaN-based light-emitting diodes vis surface roughening", App. Phys. Let., vol. 84, No. 6, pp. 855-857 (Feb. 9, 2004).

Gao et al., "Roughening Hexagonal Surface Morphology on Laser Lift-Off (LLO) N-Face GaN with Simple Photo-Enhanced Chemical Wet Etching", Japanese J. of App. Phys., vol. 43, No. 5A, pp. L637-L639 (2004).

Gessmann et al., "AlGaInP light-emitting diodes with omni-directionally reflecting submount", Proc. Of SPIE, vol. 4996, pp. 26-39 (2003).

Gessmann et al., "GaInN light-emitting diodes with omni directional reflectors", Proc. Of SPIE, vol. 4996, pp. 139-144 (2003).

Schubert et al., "Light-Emitting Diodes", Elsevier Encyclopedia of Condensed Matter Physics: Instruments/devices: Optoelectronic devices, pp. 1-17 (2004).

Schubert et al., "Inorganic Semiconductors for Light-emitting Diodes", Organic Light Emitting Devices, Synthesis, Properties and Applications, Edited by Klaus Mullen and Ullrich Scherf; pp. 1-33 (2006).

Guo et al., "Current crowding and optical saturation effects in GaInN/GaN light-emitting diodes grown on insulating substrates", App. Phys. Let., vol. 78, No. 21, pp. 3337-3339 (May 21, 2001).

Jang et al., "Characterization of band bendings on Ga-face and N-face GaN films grown by metalorganic chemical-vapor deposition", App. Phys. Let., vol. 80, No. 21, pp. 3955-3957 (Mayu 27, 2002).

Kato et al., "GaAs/GaAlAs surface emitting IR LED with Bragg reflector grown by MOCVD", J. Crystal Grown, vol. 107, pp. 832-835 (1991).

Chernyak et al., "Electron beam-induced increase of electron diffusion length in p-tyle GaN and AlGaN/GaN supperlattices", App. Phys. Let., vol. 77, No. 6, pp. 875-877 (Aug. 7, 2000).

Kelly et al., "Optical patterning of GaN films", Appl. Phys. Let., vol. 69, No. 12, pp. 1749-1751 (Sep. 16, 1996).

Kim et al., "GaInN light-emitting diodes with $RuO_2/SiO_2$/Ag omnidirectional reflector", Appl. Phys. Let., vol. 84, No. 22, pp. 4508-4510 (May 31, 2004).

Vanderwater et al., "High-Brightness AlGaInP Light Emitting Diodes", Proc. Of IEEE, vol. 85, No. 11, pp. 1752-1764 (Nov. 1997).

Kwak et al., "Crystal-polarity dependence of Ti/Al contacts to free-standing n-GaN substrate", App. Phys. Let., vol. 79, No. 20, pp. 3254-3256 (Nov. 12, 2001).

Li et al., "Performance characteristics of white light sources consisting of multiple light-emitting diodes", Proc Of SPIE, vol. 5187, pp. 178-184 (2004).

Sugawara et al., "High-brightness InGaAIP green light-emitting diodes", Appl. Phys. Let., vol. 61, No. 12, pp. 1775-1777 (Oct. 12, 1992).

Wong et al., "Damage-free separation of GaN thin films from sapphire substrates", Appl. Phys. Let., vol. 72, No. 5, pp. 599-601 (Feb. 2, 1998).

Wong et al., "Fabrication of thin-film InGaN light-emitting diode membranes by laser lift-off", Appl. Phys. Let., vol. 75, No. 10, pp. 1360-1362 (Sep. 6, 1999).

Wen et al., "Fabrication of Nitride-based Light Emitting Diodes by Laser Lift-Off and Low Temperature Gold-Indium Eutectic Bonding", Appl. Phys. Let., vol. 75, pp. 122-123 (1999).

Wong et al., "$In_xGa_{1-x}N$ light emitting diodes on Si substrates fabricated by Pd-In metal bonding and laser lift-off", Appl. Phys. Let., vol. 77, No. 18, pp. 2822-2824 (Oct. 30, 2000).

Xi et al., "Silica Nanorod-Array Films with Very Low Refractive Indices", Nano Letters, vol. 5, No. 7, pp. 1385-1387 (2005).

Xi et al., "Junction Temperature in Ultraviolet Light-Emitting Diodes", Japanese J. of Appl. Phys., vol. 44, No. 10, pp. 7260-7266 (2005).

Schubert et al., "Solid-State Light Sources Getting Smart", Science, vol. 308, pp. 1274-1278 (2005).

Kim et al. "P-type conductivity in bulk $Al_xGa_{1-x}N$ and $Al_xGa_{1-x}N/Al_yGa_{1-y}N$ superlattices with average Al mole fraction > 20%", Appl. Phys. Let., vol. 84, No. 17, pp. 3310-3312 (Apr. 26, 2004).

Waldron et al., "Experimental study of perpendicular transport in weakly coupled $Al_xGa_{1-x}N$/GaN superlattices", Appl. Phys. Let., vol. 83, No. 24, pp. 4975-4977 (Dec. 15, 2003).

Gessmann et al., "Ohmic contacts to p-type GaN mediated by polarization fileds in thin $In_xGa_{1-x}N$ capping layers", Appl. Phys. Let., vol. 80, No. 6, pp. 986-988 (Feb. 11, 2002).

Waldron et al., "Improved mobilities and resistivities in modulation-doped p-type AlGaN/GaN superlattices", Appl. Phys. Let., vol. 79, No. 17, pp. 2737-2739 (Oct. 22, 2001).

Kim et al., "Light Extraction in GaInN Light-Emitting Diodes using Diffuse Omnidirectional Reflectors", J. Electrochemical Soc., vol. 153, No. 2, pp. G105-G107 (2006).

Kim et al., "GaInN light-emitting diode with conductive omnidirectional reflector having a low-refractive-index indium-tin oxide layer", Appl. Phys. Let., vol. 88, pp. 013501-1-013501-3 (2006).

Kim et al., "Strongly Enhanced Phosphor Efficiency in GaInN White Light-Emitting Diodes Using Remote Phosphor Configuration and Diffuse Relector Cup", Japanese J. of Appl. Phys., vol. 44, No. 21, pp. L649-L651 (2005).

Kim et al., "Current conduction mechanism of Pt/GaN and $Pt/Al_{0.35}Ga_{0.65}N$ Schottky diodes", J. Appl. Phys., vol. 94, No. 11, pp. 7201-7205 (Dec. 1, 2003).

Kim et al., "Effect of Surface Treatment on Schottky Barrier Height of p-Type GaN", J. of Electromechanical Soc., vol. 150, No. 3, p. G209-G211(2003).

Kim et al., "Mechanism for Ohmic contact formation of Ti on n-type GaN investigates using synchrotron radiation photoemission spectroscopy", J. Appl. Phys., vol. 91, No. 11, pp. 9214-9217 (Jun. 1, 2002).

Stocker et al., "Crystallographic Wet Chemical Etching of p-Type GaN", J. Electrochemical Soc., vol. 147, No. 2, pp. 763-764 (2000).

Goepfert et al., "Efficient Acceptor Activation in $Al_xGa_{1-x}N$/GaN Doped Superlattices", MRS Internet a Journal Nitride Semiconductor Research (http://nsr.mij.mrs.org/5S1/W3.85) (Mar. 2000).

Guo et al., "Photon Recycling Semiconductor Light Emitting Diode", IEDM Technical Digest, IEDM-99, p. 600 (1999).

Schubert et al., "Low-resistance ohmic contacts to p-type GaN", Appl. Phys. Let., vol. 76, No. 19, pp. 2728-2730 (May 8, 2000).

Guo et al., "Photon-Recycling for High Brightness LEDs", Compound Semiconductor, vol. 6, No. 4, pp. 1-4 (May/Jun. 2000).

Graff et al., "Flat free-standing silicon diaphragms using silicon-on-insultor wafers", Sensors and Actuators, vol. 84, pp. 276-279 (2000).

Goepfert et al., "Experimental and theoretical study of acceptor activation and transport properties in p-type $Al_xGa_{1-x}N$/GaN superlattices", J. Appl. Phys., vol. 88, No. 4, pp. 2030-2038 (Aug. 15, 2000).

Graff et al., "On the Reduction of Base Resistance in GaN-based Heterojunction Bipolar Transistors", Proceedings of the 2000 IEEE/Cornell Conference on High-Performance Devices, p. 28 (Oct. 2000).

Osinsky et al, "New Concepts and Preliminary Results for SiC Bipolar Transistors: $ZnSiN_2$ and $ZnGeN_2$ Heterojunction Emitters", Proceedings of the 2000 IEEE/Cornell Conference on High-Performance Devices, p. 28 (Oct. 2000).

Stocker et al., "Optically pumped InGaN/GaN lasers with wet-etched facets", Appl. Phys. Let., vol. 77, No. 26, pp. 4253-4255 (Dec. 25, 2000).

Waldron et al., "Polarization effects in $Al_xGa_{1-x}N$/GaN superlattices", Proceedings of MRS Fall Conference (Dec. 2000).

Graff et al., "GaN/SiC p-n mesa junctions for HBTs fabricated using selective photoelectrochemical etching", Elec. Let., vol. 37, No. 4, pp. 249-250 (Feb. 15, 2001).

Guo et al., "Current crowding and optical saturation effects in GaInN/GaN LEDs grown on insulating substrates", Proc. Of SPIE, vol. 4278, pp. 133-140 (2001).

Chernyak et al., "Minority Electron Transport Anisotropy in P-Type $Al_xGa_{1-x}N$/GaN Superlattices", IEEE Trans. Of Elec. Dev., vol. 48, No. 3, pp. 433-437, (Mar. 3, 2001).

Guo et al., "Efficiency of GaN/InGaN light-emitting diodes with interdigitated mesa geometry", Appl. Phys. Let., vol. 79, No. 13, pp. 1936-1938 (Sep. 24, 2001).

Waldron et al., "Influence of Doping Profiles on p-type AlGaN/GaN Superlattices", Phys. Stat. Sol., vol. 188, No. 2, pp. 889-893 (2001).

Li et al., "Novel Polarization Enhanced Ohmic Contacts to n-Type GaN", Phys. Stat. Sol., vol. 188, No. 1, pp. 359-362 (2001).

Chernyak et al., "Influence of electron injection on performance of GaN photodetectors", Appl. Phys. Let., vol. 80, No. 6, pp. 926-928 (Feb. 11, 2002).

Gessmann et al., "Novel Type of Ohmic Contacts to P-Doped GaN Using Polarization Fields in Thin $In_xGa_{1-x}N$ Capping Layers", J. Elec. Mat., vol. 31, No. 5, pp. 416-420 (2002).

Gessmann et al., "Ohmic Contact Technology in III-V Nitrides Using Polarization Effects in Cap Layers", Proceedings of the Lester Eastman Conference on High-Speed Devices, pp. 492-501 (Sep. 2002).

Gessmann et al., "Ohmic contact technology in III nitrides using polarization effects of cap layers", J. Appl. Phys., vol. 92, No. 7, pp. 3740-3744 (Oct. 1, 2002).

Waldron et al., "Multisubband photoluminescence in p-type modulation-doped $Al_xGa_{1-x}N$/GaN superlattices", Phys. Rev., vol. 67, pp. 045327-1-045327-7 (2003).

Gessmann et al., "AlGaInP light-emitting diodes with omni-directionally reflecting submount", Proc. Of SPIE, vol. 4996, pp. 26-39 (2003).

Li et al., "Carrier dynamics in nitride-based light-emitting p-n junction diodes with two active regions emitting at different wavelengths", J. Appl. Phys. vol. 94, No. 4, pp. 2167-2172 (Aug. 15, 2003).

Shah et al., "Experimental analysis and theoretical model for anomalously high ideality factors (n>2.0) in AlGaN/GaN p-n junction diodes", J. Appl. Phys., vol. 94, No. 4, pp. 2627-2629 (Aug. 15, 2003).

Gessmann et al., "Omnidirectional Reflective Contacts for Light-Emitting Diodes", IEEE Elec. Dev. Let., vol. 24, No. 10, pp. 683-685 (Oct. 2003).

Gessmann et al., "Light-emitting diodes with integrated omnidirectionally reflective contacts", Proc. Of SPIE, vol. 5366, pp. 53-61 (2004).

Gessmann et al., "High-efficiency AlGaInP light-emitting diodes for solid-state lighting appliations", J. Appl. Phys., vol. 95, No. 5, pp. 2203-2216 (Mar. 1, 2004).

Xi et al., "Junction-temperature measurement in GaN ultraviolet light-emitting diodes using diode forward voltage method", Appl. Phys. Let., vol. 85, No. 12, pp. 2163-2165 (Sep. 20, 2004).

Xi et al., "Junction-Temperature Measurements in GaN UV Light-Emitting Diodes Using the Diode Forward Voltage", 2004 Proceedings of the Lester Eastman Conference on High-Performance Devices—Selected Topics in Electronics and Systems, edited by Robert E. Leoni III, vol. 35, pp. 102-103 (Dec. 2004).

Xi et al., "Omni-Directional Reflector Using a Low Refractive Index Material", 2004 Proceedings of the Lester Eastman Conference on High-Performance Devices—Selected Topics in Electronics and Systems, edited by Robert E. Leoni III, vol. 35, pp. 108-109 (Dec. 2004).

Kim et al., "High-Reflectivity Omni-Directional Reflectors for Light-Emitting Diodes", Proceedings of the IEDMS (Dec. 2004).

Xi et al., "Junction and carrier temperature measurements in deep-ultraviolet light-emitting diodes using three different methods", Appl. Phys. Let., vol. 86 (2005).

Xia et al., "Discrete Steps in the Capacitance-Voltage Characteristics of GaInN/GaN Light Emitting Diode Structures", Mater. Res. Soc. Symp. Proc., vol. 831, pp. E3.38.1-E3.38.6 (2005).

Xi et al., "Junction Temperature Measurements in Deep-UV Light-Emitting Diodes", Mater. Res. Soc. Symp. Proc., vol. 831, pp. E1.7.1-E1.7.6 (2005).

Chhajed et al., "Influence of junction temperature on chromaticity and color-rendering properties of trichromatic white-light sources based on light-emitting diodes", J. Appl. Phys., Vo. 97, pp. 054506-1-054506-8 (2005).

Kim et al., "Enhancement of light extraction in GaInN light-emitting diodes by diffuse omni-directional reflectors", Proc. Of Second Asia-Pacific Workshop on Widegap Semiconductors (Mar. 2005).

Furis et al., "Spectral and temporal resolution of recombination from multiple excitation states in modulation-doped AlGaN/GaN multiple quantum well heterostructures", Appl. Phys. Let., vol. 86, pp. 162103-1-162103-3 (2005).

Xi et al., "Internal Omni-Directional Reflector Using a Low Refractive Index Material for Light-Emitting Diodes", Proc. Of 2005 Conference on Lasers & Electro-Optics (CLEO), pp. 144-146 (2005).

Kim et al., "Strongly Ehnanced Phosphor Efficiency in GaInN White Light-Emitting Diodes Using Remote Phosphor Configuration and Diffuse Reflector Cup", Japanese J. of Appl. Phys., vol. 44, No. 21, pp. L649-L651 (2005).

Luo et al., "Analysis of high-power packages for phosphor-based white-light-emitting diodes", Appl. Phys. Let., vol. 86, pp. 243505-1-243505-3 (2005).

Ojha et al., "Omnidirectional reflector using nanoporous $SiO_2$ as a low-refractive-index material", Optics Lett., vol. 30, No. 12, pp. 1518-1520 (Jun. 15, 2005).

Schubert et al., "Light Emitting Diodes", Kirk-Othmer Encyclopedia of Chemical Technology, John Wiley & Sons, Inc. (http://ww.interscience.wiley.com/kirk/articles/lighkish.a01/frame.html) (Jul. 15, 2005).

Xi et al., "Internal high-reflectivity omni-directional reflectors", Appl. Phys. Let., vol. 87, pp. 031111-1-031111-3 (2005).

Xi et al,. "Low-Refractive Index Films: A New Class of Optical Materials", IEEE LEOS Newsletter, vol. 19, No. 6, pp. 10-12 (Dec. 2005).

Schubert et al., "Innovations in Light-Emitting Devices", Physics of Semiconductor Devices, edited by V. Kumar et al., Allied Publishers PVT (2005).

Kim et al., "Pulsating Traffic Light for Enhanced Recognizability and Communication", Invention disclosure submitted to RPI OTC in Jun. 2005.

Korean Office Action in corresponding Korean Patent Application No. 10-2007-0012638 (Feb. 29, 2008).

* cited by examiner

OPTICAL THIN FILM, SEMICONDUCTOR LIGHT EMITTING DEVICE HAVING THE SAME AND METHODS OF FABRICATING THE SAME

PRIORITY STATEMENT

This application claims priority under 35 USC § 119 to U.S. Provisional Application No. 60/850,657, filed on Oct. 11, 2006, in the United States Patent and Trademark Office (USPTO), the entire contents of which are herein incorporated by reference.

BACKGROUND

1. Field

Example embodiments relate to a semiconductor light emitting device. Other example embodiments relate to a highly transmissive optical thin film having an improved structure, in which, optical reflection (due to a difference in the refractive index between a semiconductor material and the air, when light is extracted from a semiconductor light emitting device into the surrounding medium (e.g., an encapsulation material)) may be suppressed, an optical output loss may be reduced and light transmittance efficiency may be maximized or increased, and a semiconductor light emitting device having the same. Other example embodiments relate to methods of fabricating the same.

2. Description of the Related Art

Light emitting devices, for example, light emitting diodes (LEDs), are basically semiconductor PN junction diodes. Silicon PN junction plays a leading role in the electronic information revolution, and a PN junction of a III-V-group compound semiconductor plays a leading role in the optical technology revolution. The III-V-group compound semiconductor may be made by combining III- and V-group elements of the periodic table of elements. III-V compounds may have an advantage of increased electrical-to-optical-conversion efficiency that may be close to about 100%. This efficiency may be about one thousand times higher than the efficiency of silicon. LEDs may be widely used in light emitting devices, from the initial stage of development of a material and may play a leading role in the optical revolution. Because III-V compounds have an increased electron speed at a given electrical field and may operate at an increased temperature, III-V compounds may be widely used in high-speed and high-power electronic devices. For example, several III- and V-group elements may be combined so that a semiconductor having a variety of material compositions and characteristics may be manufactured.

Basic characteristics of an LED are luminous intensity (units: candela (cd)), used for an LED emitting in the visible wavelength region and radiant flux (units: watt) used for LEDs irrespective of their emission region. Luminous intensity is indicated by light intensity per unit solid angle, and luminance (brightness) is indicated by luminous intensity per unit area of the emitting LED chip. A photometer may be used to measure the luminous intensity. Radiant flux may represent all power radiated by an LED, irrespective of wavelengths and may be represented by the energy radiated per unit time.

The main factors for determining a visible-spectrum LED performance may be the luminous efficiency indicated by lumen per watt (lm/W). This may correspond to the wall-plug efficiency (optical output power divided by electric input power) and may include consideration of the human eyes' luminosity factor. Luminous efficiency of an LED may be determined by three factors, for example, the internal quantum efficiency, light-extraction efficiency, and the operating voltage. Much research is currently devoted to the improvement of the luminous efficiency of LEDs.

In general, conventional III-V nitride LEDs may have a sapphire/n-type GaN/multiple-quantum well (MQW) active region/p-type GaN structure. However, in conventional LEDs having such a structure, there may be limitations when addressing current technical objectives, for example, a first objective is improving the internal quantum efficiency of an MQW active region and a second objective is the manufacturing of high-power LEDs. Accordingly, the structure of an LED needs to improve so that the limitations may be overcome and the efficiency of LEDs may be increased.

SUMMARY

Example embodiments provide an optical thin film having an improved structure, in which, optical reflection or Fresnel reflection (due to a difference in the refractive index between a semiconductor material and the ambient material (for example, air and/or an encapsulation material), when light is extracted from a semiconductor light emitting device into the ambient material) may be suppressed, an optical output loss may be reduced and light transmittance efficiency may be maximized or increased, a semiconductor light emitting device having the same, and methods of fabricating the same.

According to example embodiments, an optical thin film may include a first material layer having a first refractive index, a second material layer on the first material layer and having a second refractive index that is smaller than the first refractive index, and a graded-refractive index layer between the first material layer and the second material layer and having a multi-layer structure in which refractive index distribution gradually decreases in the range between the first refractive index and the second refractive index as the refractive index distribution progresses from the first material layer toward the second material layer.

According to example embodiments, a semiconductor light emitting layer may include an n-electrode, an n-type semiconductor layer, an active layer, a p-type semiconductor layer, a p-electrode, and the optical thin film according to example embodiments on a light emission surface through which light generated in the active layer is emitted and providing a light transmittance path.

According to example embodiments, a method of fabricating an optical thin film may include providing a first material layer having a first refractive index, forming a second material layer on the first material layer that has a second refractive index that is smaller than the first refractive index, and forming a graded-refractive index layer between the first material layer and the second material layer and having a multi-layer structure in which a refractive index distribution gradually decreases in a range between the first refractive index and the second refractive index as the refractive index distribution progresses from the first material layer toward the second material layer.

According to example embodiments, a method of fabricating a semiconductor light emitting layer may include providing an n-electrode; an n-type semiconductor layer; an active layer; a p-type semiconductor layer; a p-electrode, and forming the optical thin film according to example embodiments on a light emission surface from which light generated from the active layer is emitted and providing a light transmittance path.

The first refractive index and the second refractive index may be in a range of about 1-about 5. Each of the first material layer, the second material layer, and the graded-refractive index layer may be formed of one material selected from the group consisting of $TiO_2$, SiC, GaN, GaP, $SiN_y$, $ZrO_2$, ITO, AlN, $Al_2O_3$, MgO, $SiO_2$, $CaF_2$ and/or $MgF_2$. The second material layer and the graded-refractive index layer are formed of materials having the same components.

The graded-refractive index layer may be formed with a chemical composition of (the first material)$_x$(the second material)$_{1-x}$ (0<x<1), and a composition fraction of the second material contained in each configuration layer for configuring the graded-refractive index layer may gradually increase as the refractive index distribution becomes closer to the second material layer. The multi-layer structure includes a plurality of configuration layers containing the second material.

The second material layer and the graded-refractive index layer may be formed of a porous structure having microporosity, and porosity density of each configuration layer for configuring the graded-refractive index layer may gradually increase as the refractive index distribution becomes closer to the second material layer.

According to example embodiments, the optical thin film having an improved structure, in which, optical or Fresnel reflection (due to a difference in the refractive index between a semiconductor material and the ambient material (for example, air and/or an encapsulation material), when light is extracted from a semiconductor light emitting device into the ambient material) may be suppressed, an optical output loss may be reduced and light transmittance efficiency may be maximized or increased, and the semiconductor light emitting device, having the same, may be obtained.

BRIEF DESCRIPTION OF THE DRAWINGS

Example embodiments will be more clearly understood from the following detailed description taken in conjunction with the accompanying drawings. FIGS. 1A-6 represent non-limiting, example embodiments as described herein.

FIGS. 1A, 1B, and 1C illustrate a cross-sectional structure of an optical thin film, refractive index distribution of the optical thin film and composition distribution of the optical thin film according to example embodiments, respectively;

FIG. 2 illustrates refractive index distribution of materials used in forming the optical thin film illustrated in FIG. 1A;

FIG. 6 is a schematic cross-sectional view of a semiconductor light emitting device having a highly transmissive optical thin film according to example embodiments.

Figure 1:
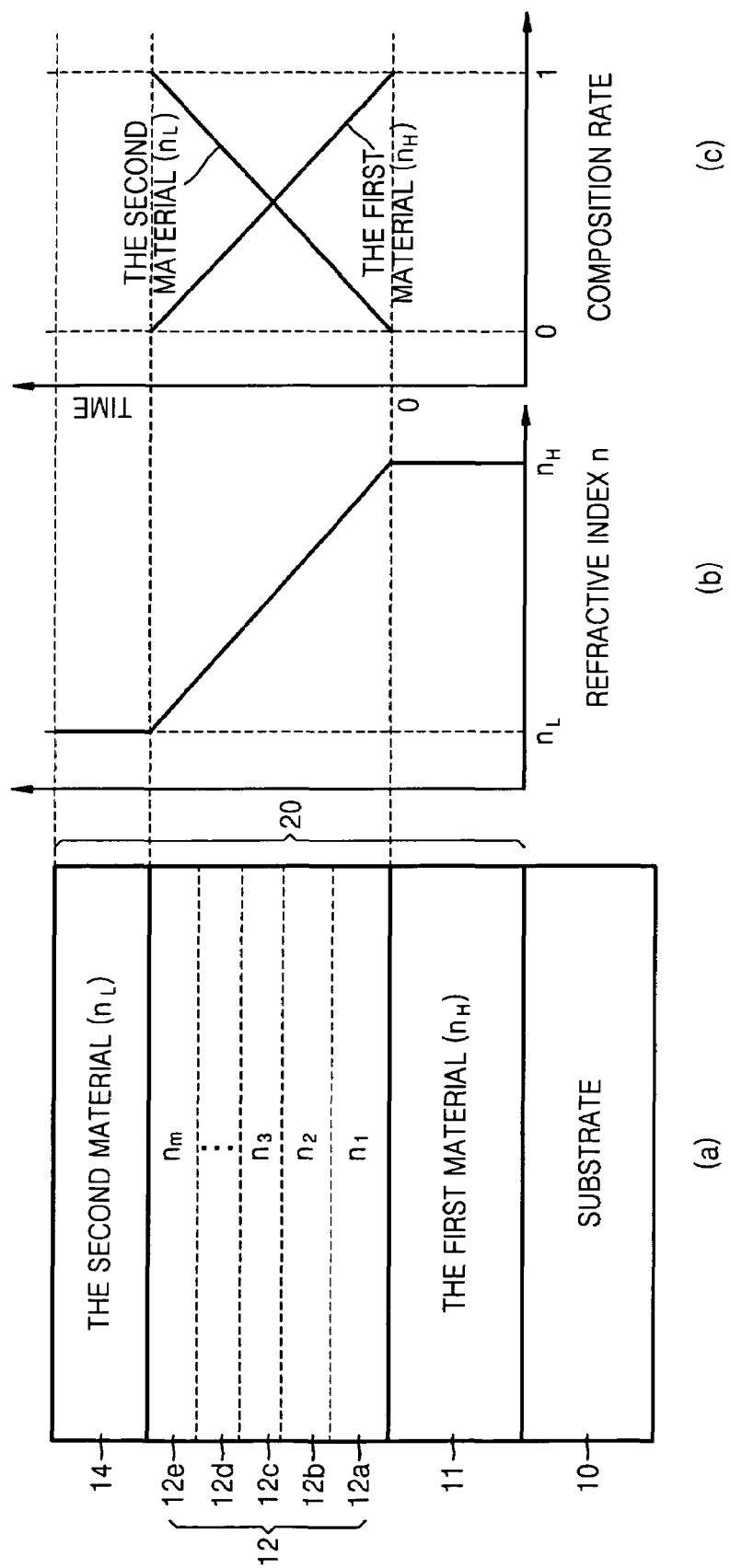

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. In particular, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will now be described more fully with reference to the accompanying drawings, in which example embodiments are shown. In example embodiments, the first layer, the second layer, and the graded-index layer interposed or inserted between the first layer and the second layer may be deposited by co-deposition method. In other example embodiments, the first layer, the second layer, and the graded-index layer interposed or inserted between the first layer and the second layer may be deposited by oblique deposition method. In the drawings, the thicknesses of layers and regions are exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
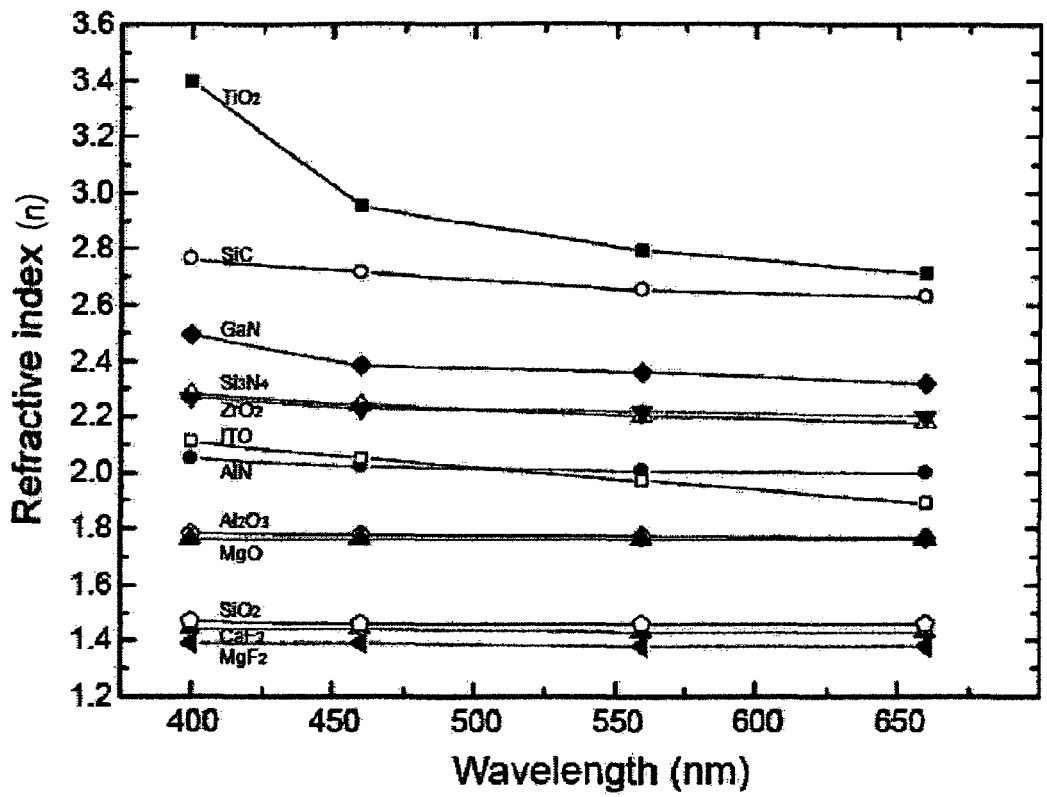

FIGS. 1A, 1B, and 1C illustrate a cross-sectional structure of an optical thin film, refractive index distribution of the optical thin film and composition distribution of the optical thin film according to example embodiments, respectively. FIG. 2 illustrates refractive index distribution of materials used in forming the optical thin film illustrated in FIG. 1A.

Referring to FIG. 1A, a highly transmissive optical thin film 20 may include a first material layer 11, a graded-refractive index layer 12, and a second material layer 14, which are sequentially stacked on a substrate 10. Each material layer may be formed by sputtering and/or evaporation. The first material layer 11 may have a first refractive index $n_H$, and the second material layer 14 may have a second refractive index $n_L$ that is smaller than the first refractive index $n_H$ ($n_L<n_H$). The first refractive index $n_H$ and the second refractive index $n_L$ may be in the range of about 1-about 5. Each of the first material layer 11 and the second material layer 14 may be formed of one material selected from the group consisting of $TiO_2$, SiC, GaN, GaP, $SiN_y$, $ZrO_2$, ITO, AlN, $Al_2O_3$, MgO, $SiO_2$, $CaF_2$ and/or $MgF_2$. The refractive index distribution of these materials used in forming the optical thin film is illustrated in FIG. 2. The materials may have refractive indices in the range of about 1-about 5. The refractive indices may be refractive indices with respect to wavelengths of about 350 nm to about 700 nm.

Referring to FIG. 1B, the graded-refractive index layer 12 may be interposed or inserted between the first material layer 11 and the second material layer 14. The graded-refractive index layer 12 may have a multi-layer structure in which refractive index distribution gradually decreases in the range between the first refractive index $n_H$ and the second refractive index $n_L$ as the refractive index distribution progresses from the first material layer 11 toward the second material layer 14. For example, the graded-refractive index layer 12 may include a plurality of configuration layers 12a, 12b, 12c, 12d, and 12e each having refractive indices $n_1$, $n_2$, $n_3$, ..., $n_m$ ($n_L<n_1<n_2<n_3<...<n_m<n_H$, where m is a positive integer). The configuration layers 12a, 12b, 12c, 12d, and 12e may be formed of one material selected from the group consisting of $TiO_2$, SiC, GaN, GaP, $SiN_y$, $ZrO_2$, ITO, AlN, $Al_2O_3$, MgO, $SiO_2$, $CaF_2$ and/or $MgF_2$ or from a mixture of essentially two of these materials. The following example embodiments may be implemented, so as to realize a structure in which refractive indices may be gradually changed within the graded-refractive index layer 12. And the example embodiments may be implemented respectively or together.

Referring to FIG. 1C, each of the configuration layers 12a, 12b, 12c, 12d, and 12e of the graded-refractive index layer 12 may be formed by multi-target co-deposition with a composition of (the first material)$_x$(the second material)$_{1-x}$ (0<x<1). The composition fraction of the second material contained in each of the configuration layers 12a, 12b, 12c, 12d, and 12e of the graded-refractive index layer 12 may gradually increase as the refractive index distribution becomes closer to the second material layer 14. The graded-refractive index layer 12 may be a mixed composition of the first material and the second material having different refractive indices. Because the refractive index $n_L$ of the second material is smaller than the refractive index $n_H$ of the first material, refractive indices of the configuration layers 12a, 12b, 12c, 12d, and 12e of the graded-refractive index layer 12 may gradually decrease as the composition fraction of the second material increases.

The second material layer 14 and the graded-refractive index layer 12 may be formed by a porous material structure having micro-porosity and/or nano-porosity. Porosity density of the second material layer 14 may be larger than porosity density of each of the configuration layers 12a, 12b, 12c, 12d, and 12e of the graded-refractive index layer 12. As the refractive index distribution becomes closer to the second material layer 14, porosity density of each of the configuration layers 12a, 12b, 12c, 12d, and 12e of the graded-refractive index layer 12 may gradually increase. The porosity density of the second material layer 14 may be about 90%, and the porosity density of the graded-refractive index layer 12 may be less than about 90%. The micro-porosity may include an air pore of a micro-diameter (about <1 μm), for example, a nano-air pore of the micro-diameter. Because the micro-porosity includes air and the refractive index of the air is relatively small, e.g., about 1, the refractive index of each of the configuration layers 12a, 12b, 12c, 12d, and 12e of the graded-refractive index layer 12 may gradually decrease as the porosity density of the micro-porosity increases. The micro-porosity may be formed by changing a deposition angle and/or an oblique angle θ of a substrate with respect to the flux of a vapor source when a process of depositing a thin film is performed. Porosity density may be controlled according to a change of the deposition angle. The deposition angle may be defined as an angle formed by a deposition surface on the substrate with respect to the flux of the vapor source. For example, the first material layer 11, the second material layer 14, and the graded-refractive index layer 12 may be formed of materials having the same chemical components.

According to example embodiments, the optical thin film, having a structure in which refractive indices continuously decreases in the range of about 1-about 5, may be obtained. When light having wavelengths of about 350 nm to about 700 nm is transmitted through the optical thin film whose refractive index continuously changes, optical reflection due to a difference in refractive index between a semiconductor material and the ambient material may be suppressed and light transmittance may be relatively high. For example, when the optical thin film is formed on a light emission surface of a semiconductor light emitting device, optical reflection (due to a difference in the refractive index between a semiconductor material and the ambient material, when light is extracted from a semiconductor light emitting device into the ambient material) may be suppressed, an optical output loss may be reduced and light transmittance efficiency may be maximized or increased.

Figure 3A:
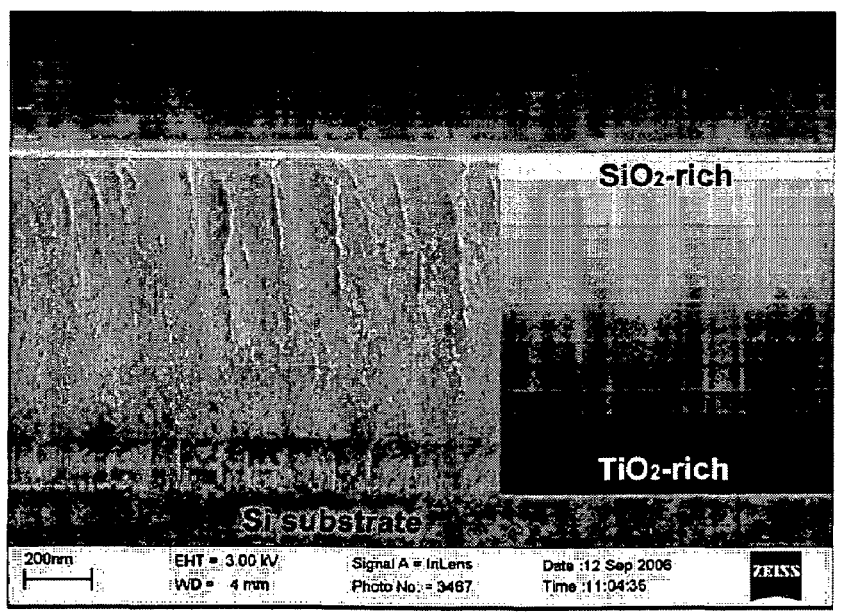
FIG. 3A is a scanning electron microscope (SEM) photo illustrating a cross-sectional structure of an optical thin film according to example embodiments.
Figure 3B:
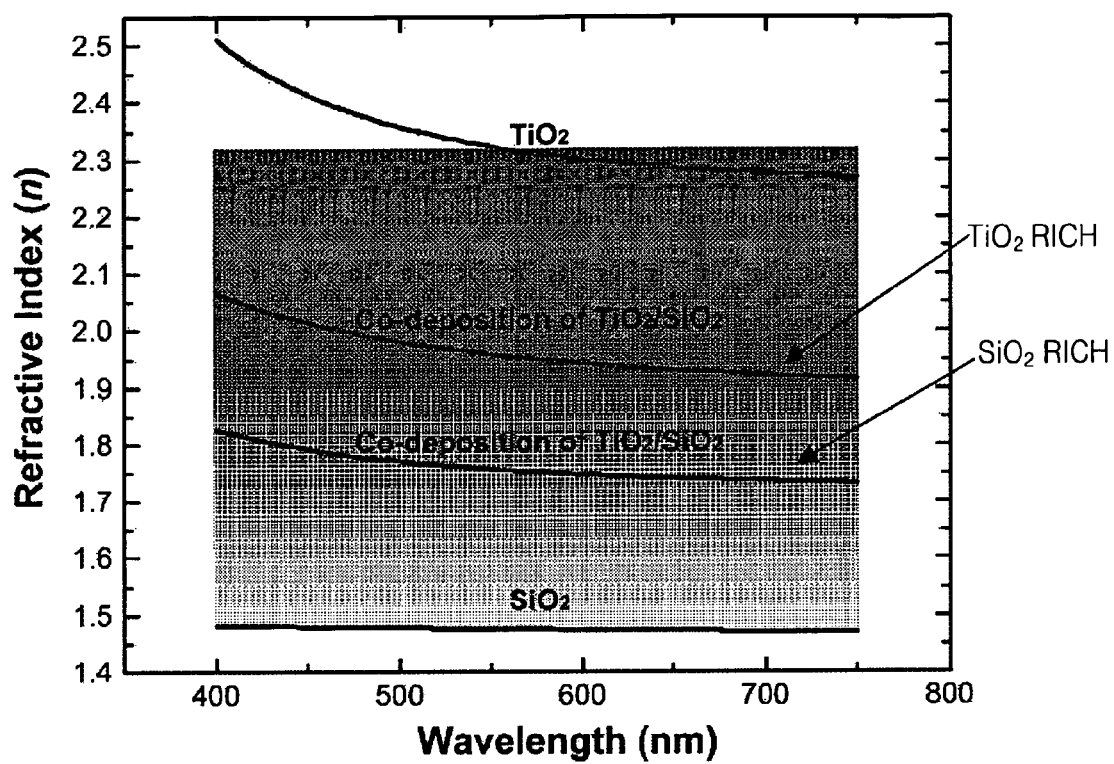
FIG. 3B is a graph illustrating refractive index distribution of the optical thin film illustrated in FIG. 3A.
Figure 3C:
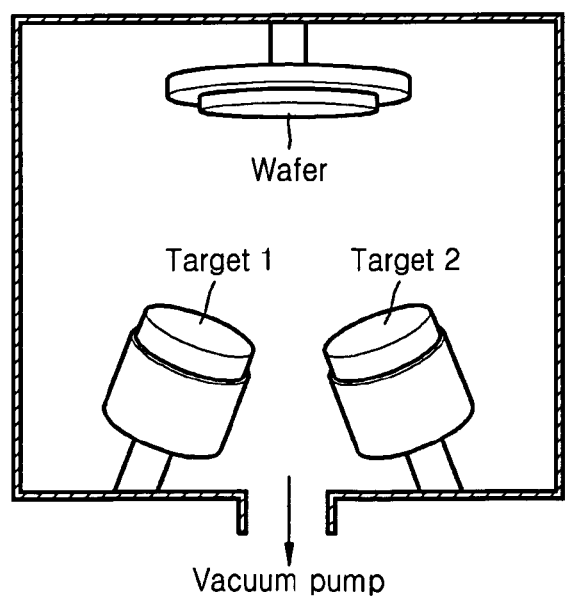
FIG. 3C illustrates an apparatus for forming the optical thin film illustrated in FIG. 3A.

FIG. 3A is a scanning electron microscope (SEM) photo illustrating a cross-sectional structure of an optical thin film according to example embodiments, and FIG. 3B is a graph illustrating refractive index distribution of the optical thin film illustrated in FIG. 3A. FIG. 3C illustrates an apparatus for forming the optical thin film illustrated in FIG. 3A.

Referring to FIGS. 3A and 3B, the optical thin film may include a $TiO_2$ layer having an increased refractive index (based on light wavelength of about 550 nm) of about 2.3, a graded-refractive index layer having the composition of $(TiO_2)_x(SiO_2)_{1-x}$ (0<x<1), and an $SiO_2$ layer having a decreased refractive index of about 1.44, which are sequentially stacked on a substrate. The graded-refractive index layer may have a structure in which refractive indices gradually decrease within the range of about 2.3-about 1.44 according to the composition of $(TiO_2)_x(SiO_2)_{1-x}$ (0<x<1). As the refractive index value becomes closer to the value of the $SiO_2$ layer, the composition fraction of $SiO_2$ may increase and its refractive index distribution may gradually decrease. A multi-target co-sputtering apparatus illustrated in FIG. 3C is used.

In FIG. 3C, targets 1 and 2 denote a $TiO_2$ source and an $SiO_2$ source, respectively.

Figure 4A:
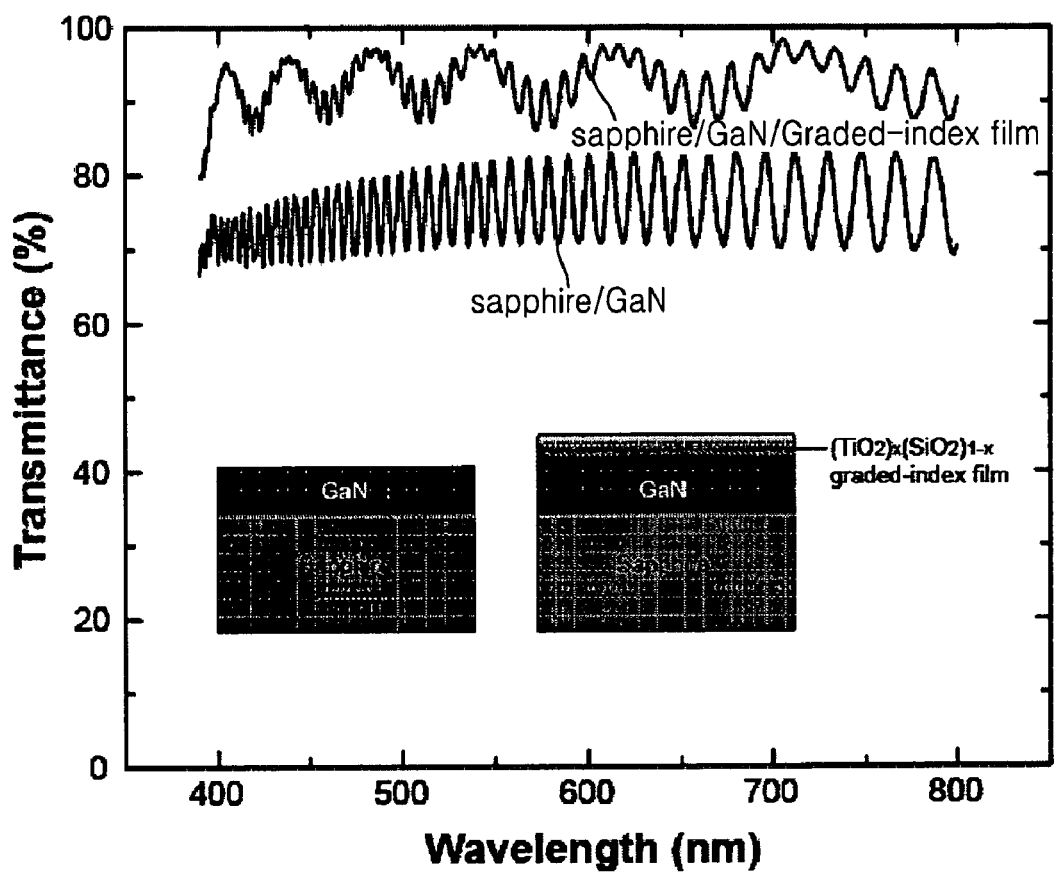
FIG. 4A is graph illustrating transmittance of the optical thin film illustrated in FIG. 3A.
Figure 4B:
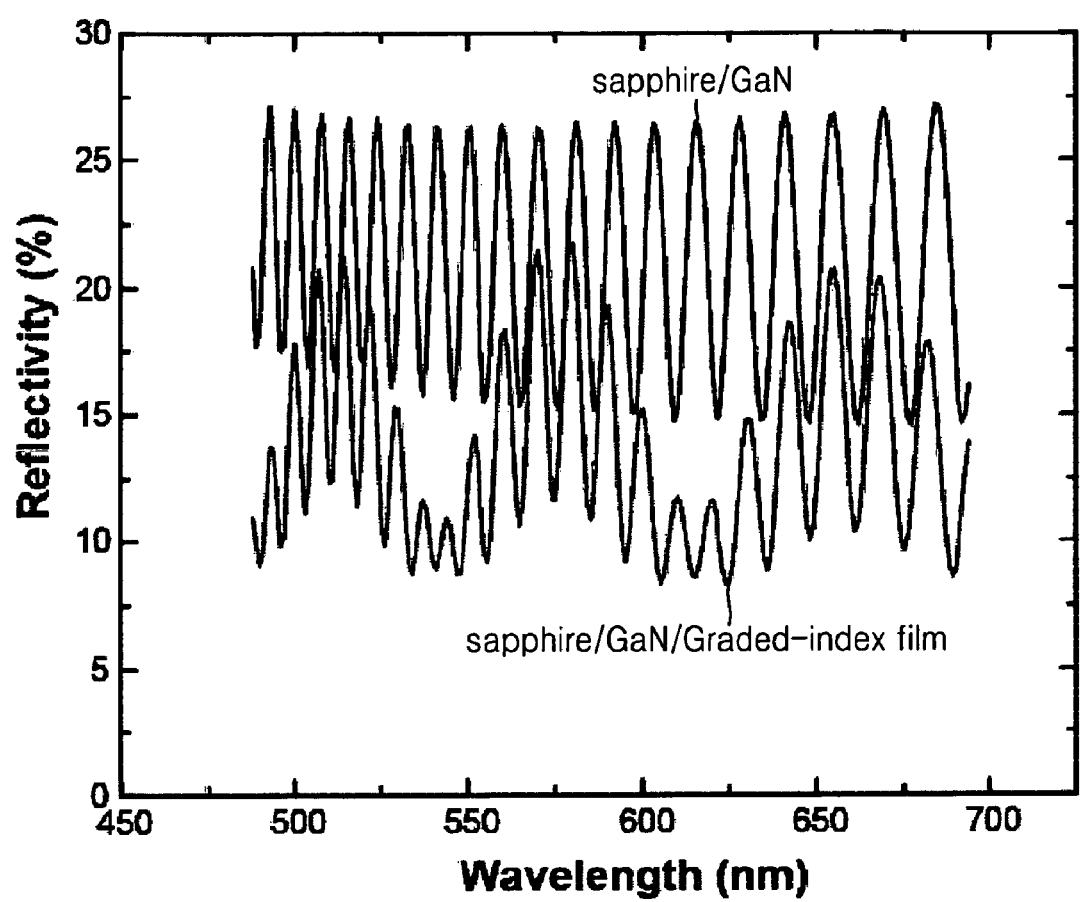
FIG. 4B is graph illustrating reflectivity of the optical thin film illustrated in FIG. 3A.
Figure 5A:
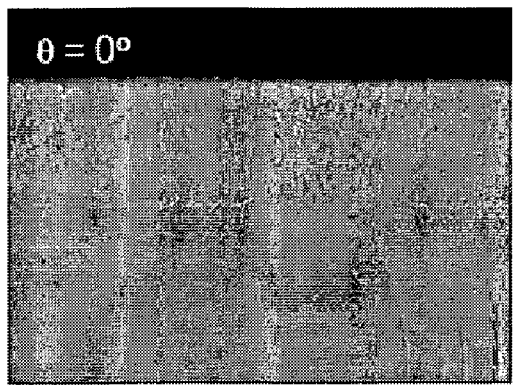
FIG. 5A is a cross-sectional SEM photo illustrating porosity density distribution in accordance with a change of a deposition angle and/or an oblique angle in an optical thin film deposition system according to other example embodiments.
Figure 5A:
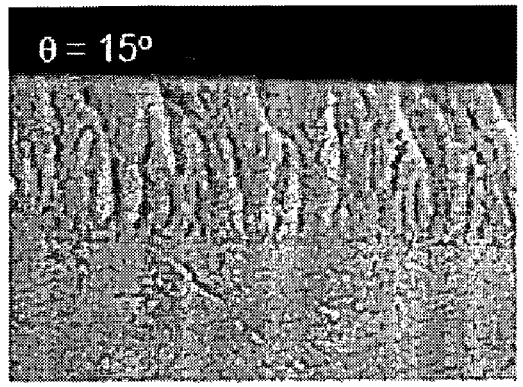
Figure 5A:
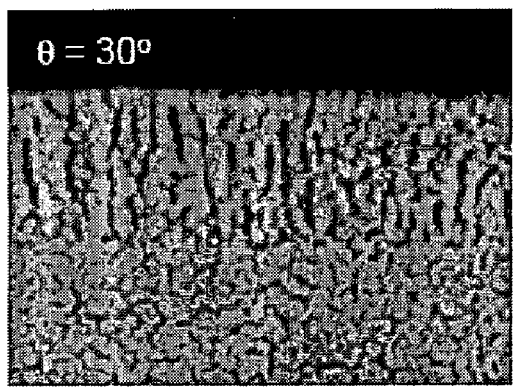
Figure 5A:
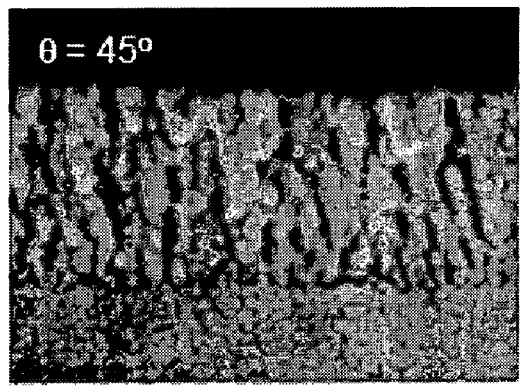
Figure 5A:
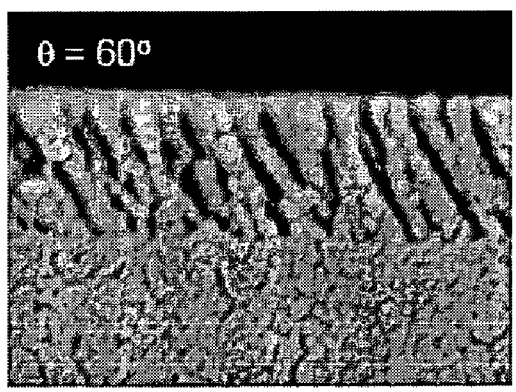
Figure 5A:
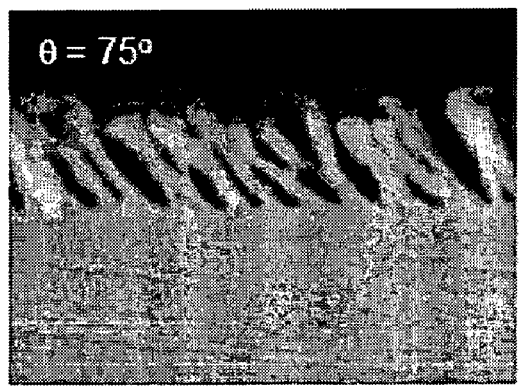
Figure 5B:
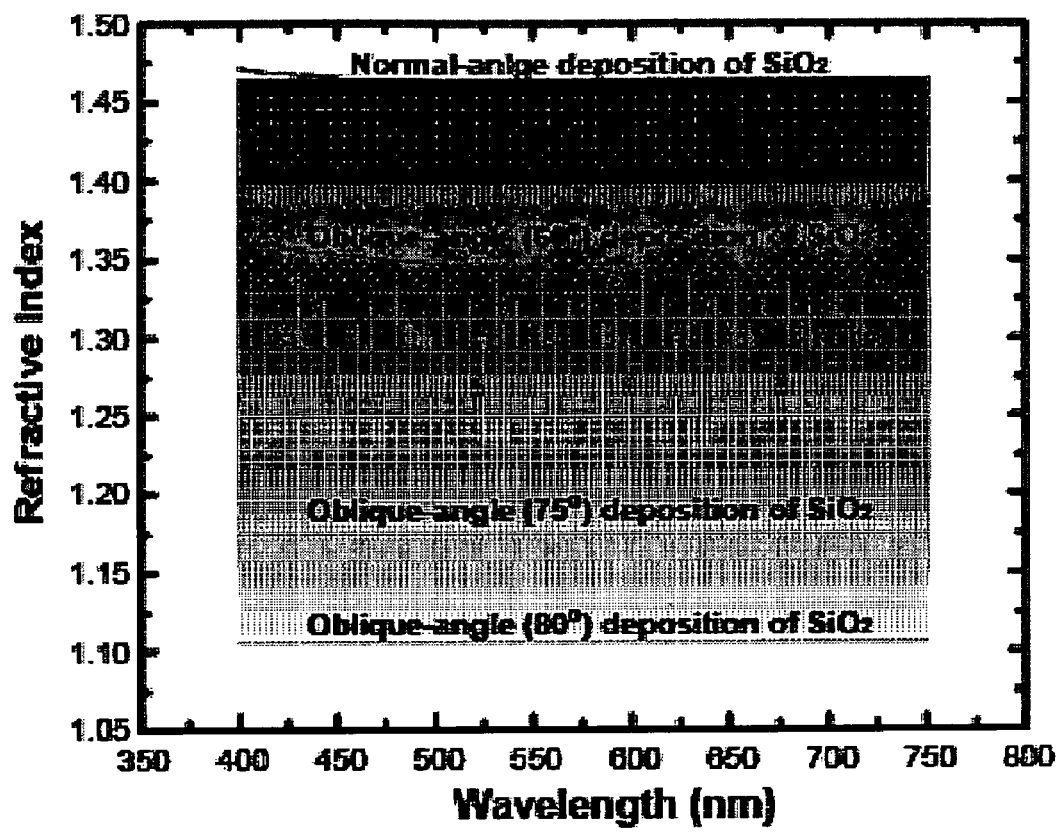
FIG. 5B is a graph illustrating refractive index distribution of the optical thin film illustrated in FIG. 5A.
Figure 5C:
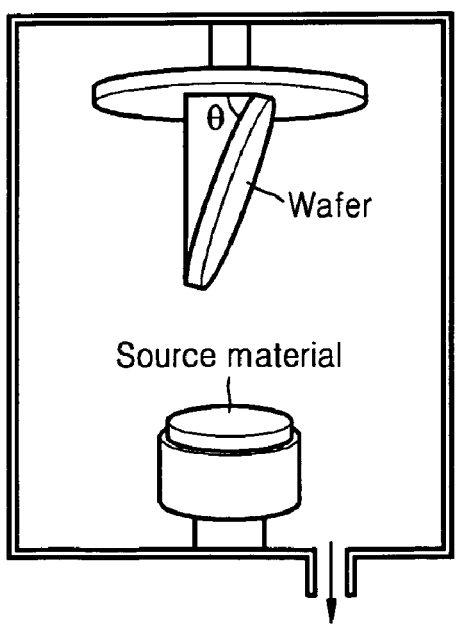
FIG. 5C illustrates an apparatus for forming the optical thin film illustrated in FIG. 5A.
Figure 5D:
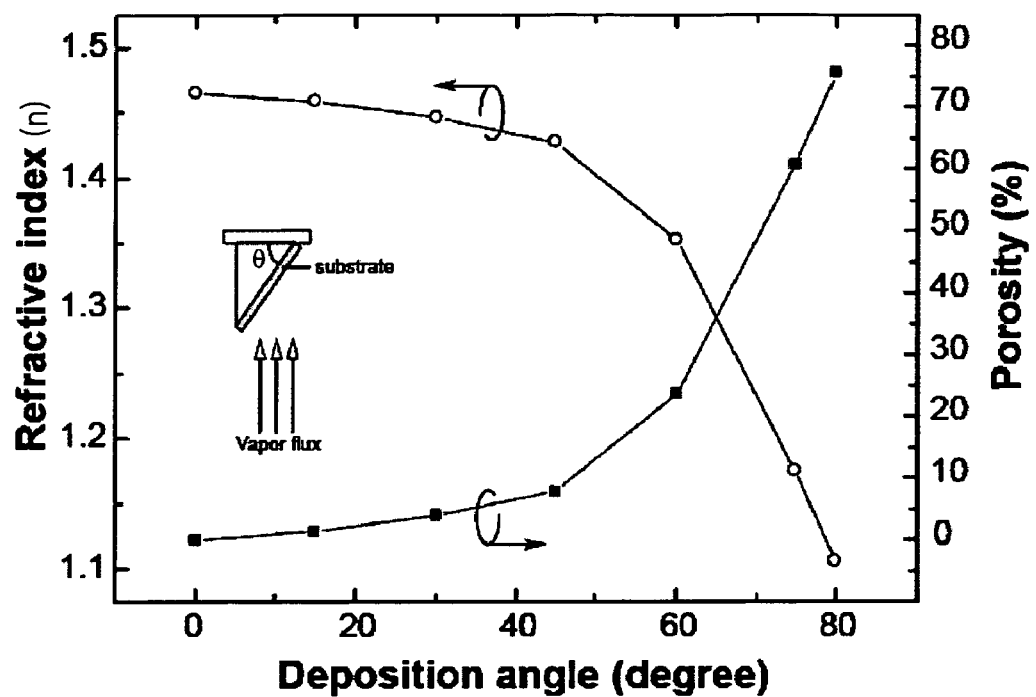
FIG. 5D is a graph illustrating a change of refractive index distribution in accordance with a change of a deposition angle in the optical thin film illustrated in FIG. 5A.

FIGS. 4A and 4B are graphs illustrating transmittance and reflectivity of the optical thin film illustrated in FIG. 3A, respectively. Transmittance characteristics of the optical thin film including the graded-refractive index layer illustrated in FIG. 3A may be improved. FIG. 5A is a cross-sectional SEM photo illustrating porosity density distribution within an $SiO_2$ layer in accordance with a change of a deposition angle and/or an oblique angle θ of a substrate, and with respect to flux of a vapor source in an optical thin film according to example embodiments. FIG. 5B is a graph illustrating refractive index distribution with respect to light wavelength of the optical thin film illustrated in FIG. 5A. FIG. 5C illustrates an apparatus for forming the optical thin film illustrated in FIG. 5A. FIG. 5D is a graph illustrating a change in the refractive index distribution in accordance with a change of a deposition angle in the optical thin film illustrated in FIG. 5A.

Referring to FIGS. 5A-5D, the optical thin film may include a first material layer, a second material layer, and a graded-refractive index layer, all of which may be formed of $SiO_2$. Porosity density of micro-porosity, within the $SiO_2$ layer, may be controlled so that refractive index distribution of the $SiO_2$ layer may gradually decrease. For example, porosity density of micro-porosity, within the $SiO_2$ layer, may gradually increase in the deposition-angle range of about 0° to about 90°, as the deposition angle θ increases. As the porosity density increases, the refractive index of the $SiO_2$ layer may decrease from about 1.46 to about 1.1. The deposition angle θ may be defined as an angle formed by a deposition surface-normal on the substrate with respect to flux direction of the vapor source.

Figure 6:
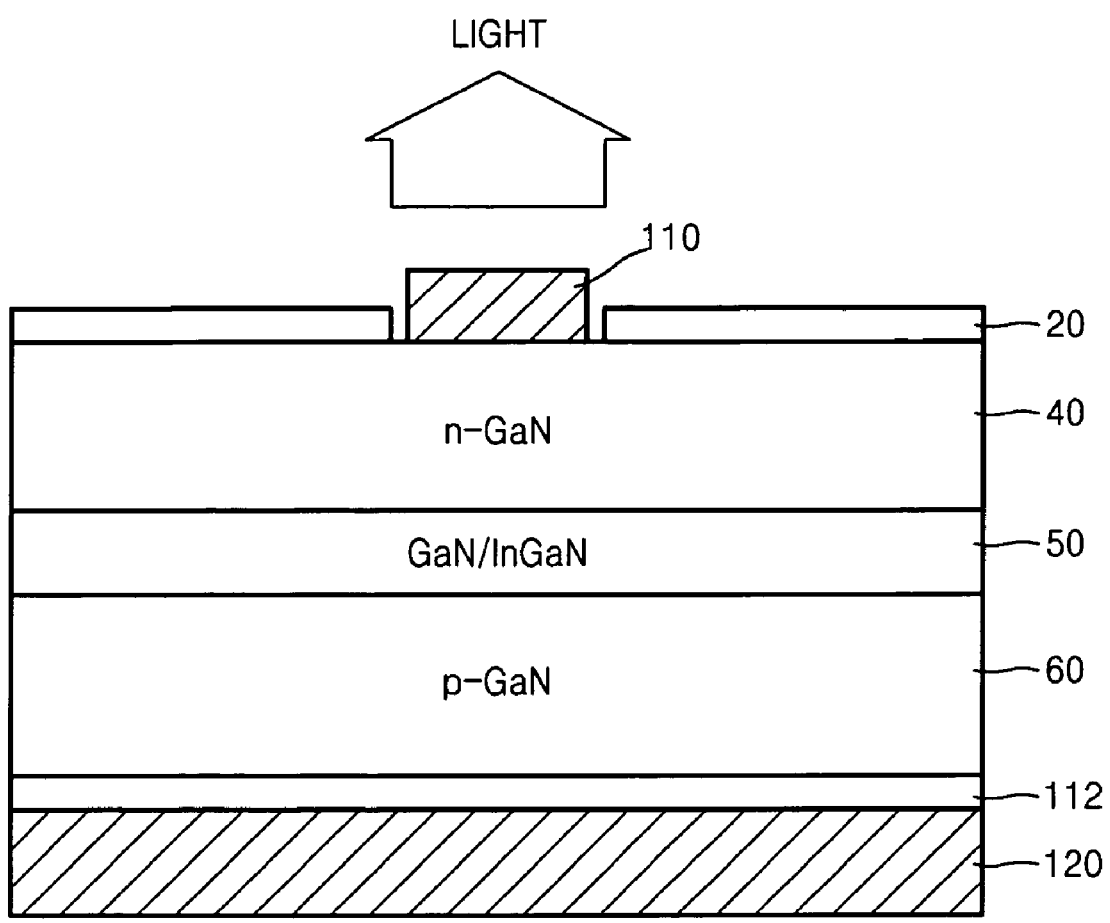

FIG. 6 is a schematic cross-sectional view of a semiconductor light emitting device having a highly transmissive optical thin film according to example embodiments. The structure, material, and effect of a highly transmissive optical thin film 20 have been already specifically described with reference to FIGS. 1-5D and thus, a repeated description of same elements will be omitted.

Referring to FIG. 6, the semiconductor light emitting device may include an n-type semiconductor layer 40, an active layer 50, and a p-type semiconductor layer 60, which are sequentially stacked between an n-electrode 110 and a p-electrode 120. The semiconductor light emitting device may further include an optical thin film 20 formed on a light emission surface through which light generated in the active layer 50 is emitted and provides a light transmittance path. A reflection electrode 112 formed of a light reflection material, e.g., Ag, may be formed between the p-type semiconductor layer 60 and the p-electrode 120. The n-type semiconductor layer 40 may be formed of an AlGaN-based III-V-group nitride semiconductor material, and for example, the n-type semiconductor layer 40 may be an n-type GaN layer. The p-type semiconductor layer 60 may be a p-type GaN-based III-V-group nitride semiconductor material layer, a p-type GaN layer and/or a p-type GaN/AlGaN layer, for example.

The active layer 50 may be a GaN-based III-V-group nitride semiconductor layer which is $In_xAl_yGa_{1-x-y}N$ (0≦x<1, 0≦y<1 and 0≦x+y<1), an InGaN layer and/or an AlGaN layer, for example. The active layer 50 may have one structure of a multi-quantum well (hereinafter, referred to as 'MQW') structure and a single quantum well structure. The structure of the active layer 50 does not limit the technical scope of example embodiments. For example, the active layer 50 may have a GaN/InGaN/GaN MQW and/or AlGaN/GaN/AlGaN MQW structure. The n-electrode 110 and the p-electrode 120 may be formed of a metallic material, e.g., Au, Al, Ti, Nu, or Ag and/or a transparent conductive material.

In the semiconductor light emitting device having the above structure, if a predetermined or desired voltage is applied between the n-electrode 110 and the p-electrode 120, electrons and holes may be injected into the active layer 50 from the n-type semiconductor layer 40 and the p-type semiconductor layer 60 and recombine within the active layer 50 so that light may be generated from the active layer 50. The optical thin film 20 may include a first material layer 11, a graded-refractive index layer 12, and a second material layer 14, which are sequentially stacked on a light emission surface, for example, an upper surface of the n-type semiconductor layer 40. Each material layer may be formed by sputtering and/or evaporation.

The first material layer 11 may have a first refractive index $n_H$, and the second material layer 14 may have a second refractive index $n_L$ that is smaller than the first refractive index $n_H$ ($n_L < n_H$). The first refractive index $n_H$ and the second refractive index $n_L$ may be in the range of about 1-about 5. For example, each of the first material layer 11 and the second material layer 14 may be formed of one material selected from the group consisting of $TiO_2$, SiC, GaN, GaP, $SiN_y$, $ZrO_2$, ITO, AlN, $Al_2O_3$, MgO, $SiO_2$, $CaF_2$ and/or $MgF_2$. For example, the first material layer 11 may be formed of a material used in forming the light emission surface. The first material layer 11 may be formed of a material having the same refractive index as that of n-type GaN, which is a material used in the n-type semiconductor layer 40. The refractive index may be defined as the refractive index with respect to wavelengths of about 350 nm to about 700 nm. The graded-refractive index layer 12 may be interposed or inserted between the first material layer 11 and the second material layer 14 and may have a multi-layer structure in which the refractive index distribution may gradually decrease in the range between the first refractive index $n_H$ and the second refractive index $n_L$ as the refractive index distribution progresses from the first material layer 11 toward the second material layer 14.

Because the light emission surface may change according to the structure of a semiconductor light emitting device, for example, a top emission type semiconductor light emitting device and/or a flip chip type semiconductor light emitting device, the light emission surface may be defined as an outermost surface and/or a boundary surface from which light generated in the active layer 50 is emitted to an outer ambient material (for example, air and/or an encapsulation material). The light emission surface may be one selected from the group consisting of a substrate (not shown), an n-electrode 110, an n-type semiconductor layer 40, a p-type semiconductor layer 60 and/or a p-electrode 120. In the semiconductor light emitting device illustrated in FIG. 6, an upper surface of the n-type semiconductor layer 40 may be a light emission surface, and the optical thin film 20 may be formed on the upper surface of the n-type semiconductor layer 40.

However, in the case of a semiconductor light emitting device having another structure (not shown), for example, when the light emission surface is provided by the n-electrode 110, the n-electrode 110 may be formed of a transparent conductive nitride and/or a transparent conductive oxide, for example. Similarly, when the light emission surface is provided by the p-electrode 120, the p-electrode 110 may be formed of a light transmittance material, for example, a transparent conductive nitride and/or a transparent conductive oxide. A material used in forming a transparent electrode may be one material selected from the group consisting of indium tin oxide (ITO), zinc-doped indium tin oxide (ZITO), zinc indium oxide (ZIO), gallium indium oxide (GIO), zinc tin oxide (ZTO), fluorine-doped tin oxide (FTO), aluminum-doped zinc oxide (AZO), gallium-doped zinc oxide (GZO), $In_4Sn_3O_{12}$ and/or zinc magnesium oxide ($Zn_{(1-x)}Mg_xO$, where 0≦x≦1). Specific examples thereof may include $Zn_2In_2O_5$, $GaInO_3$, $ZnSnO_3$, F-doped $SnO_2$, Al-doped ZnO, Ga-doped ZnO, MgO and/or ZnO.

According to example embodiments, the optical thin film having an improved structure may be obtained, in which, optical reflection (due to a difference in the refractive index between a semiconductor material and the ambient material (for example, the encapsulation material and/or air), when light is extracted from a semiconductor light emitting device into the ambient material) may be suppressed, an optical output loss may be reduced and light transmittance efficiency may be maximized or increased.

When the highly transmissive optical thin film according to example embodiments is formed on the light emission surface of the semiconductor light emitting device, an optical output loss of the semiconductor light emitting device may be minimized or reduced so that optical output efficiency of the semiconductor light emitting device may be improved. The highly transmissive optical thin film according to example embodiments may be used as a broad-band anti-reflection coating layer for solar cells and display apparatuses, e.g., LCD monitors.

While example embodiments have been particularly shown and described with reference to exemplary embodiments thereof, it will be understood by those skilled in the art that various changes in form and details may be made therein without departing from the spirit and scope of the following claims.

What is claimed is:

1. An optical thin film comprising:
   a first material layer having a first refractive index;
   a second material layer on the first material layer and having a second refractive index that is smaller than the first refractive index; and
   a graded-refractive index layer between the first material layer and the second material layer and having a multi-layer structure in which a refractive index distribution gradually decreases in a range between the first refractive index and the second refractive index as the refractive index distribution progresses from the first material layer toward the second material layer,
   wherein the second material layer and the graded-refractive index layer are formed of a porous structure having micro-porosity, and the micro-porosity includes a nano-air pore.

2. The optical thin film of claim 1, wherein the first refractive index and the second refractive index are in a range of about 1- about 5.

3. The optical thin film of claim 1, wherein each of the first material layer, the second material layer, and the graded-refractive index layer is formed of one material selected from the group consisting of $TiO_2$, SIC, GaN, GaP, $SiN_y$, $ZrO_2$, ITO, AlN, $Al_2O_3$, MgO, $SiO_2$, $CaF_2$, and $MgF_2$.

4. The optical thin film of claim 3, wherein the second material layer and the graded-refractive index layer are formed of materials having the same components.

5. The optical thin film of claim 1, wherein the multi-layer structure includes a plurality of configuration layers containing the second material.

6. The optical thin film of claim 1, wherein porosity density of the second material layer is larger than porosity density of the graded-refractive index layer.

7. The optical thin film of claim 6, wherein porosity density of each of the plurality of configuration layers for configuring the graded-refractive index layer gradually increases as the refractive index distribution becomes closer to the second material layer.

8. A semiconductor light emitting layer comprising:
   an n-electrode; an n-type semiconductor layer; an active layer; a p-type semiconductor layer; a p-electrode; and
   the optical thin film according to claim 1 on a light emission surface from which light generated from the active layer is emitted and providing a light transmittance path.

9. The semiconductor light emitting device of claim 8, wherein the light emission surface is one selected from the group consisting of the n-electrode, the n-type semiconductor layer, the p-type semiconductor layer, and the p-electrode.

10. The semiconductor light emitting device of claim 9, wherein the first material layer has the same refractive index as that of a material used in forming the light emission surface.

11. The semiconductor light emitting device of claim 8, wherein the optical thin film is formed on the n-electrode and the n-electrode is formed of a transparent conductive oxide or a transparent conductive oxide.

12. The semiconductor light emitting device of claim 8, wherein the optical thin film is formed on the p-electrode and the p-electrode is formed of a transparent conductive oxide or a transparent conductive oxide.

13. A method of fabricating an optical thin film comprising:
   providing a first material layer having a first refractive index;
   forming a second material layer on the first material layer that has a second refractive index that is smaller than the first refractive index; and
   forming a graded-refractive index layer between the first material layer and the second material layer and having a multi-layer structure in which a refractive index distribution gradually decreases in a range between the first refractive index and the second refractive index as the refractive index distribution progresses from the first material layer toward the second material layer,
   wherein the second material layer and the graded-refractive index layer are formed of a porous structure having micro-porosity, and the micro-porosity includes a nano-air pore.

14. A method of fabricating a semiconductor light emitting layer comprising:
   providing an n-electrode; an n-type semiconductor layer; an active layer; a p-type semiconductor layer; a p-electrode; and
   forming the optical thin film according to claim 13 on a light emission surface from which light generated from the active layer is emitted and providing a light transmittance path.

* * * * *

UNITED STATES PATENT AND TRADEMARK OFFICE
CERTIFICATE OF CORRECTION

Page 1 of 1

PATENT NO. : 7,483,212 B2
APPLICATION NO. : 11/657648
DATED : January 27, 2009
INVENTOR(S) : Jae-Hee Cho et al.

It is certified that error appears in the above-identified patent and that said Letters Patent is hereby corrected as shown below:

On the title page item (73), should read:

Samsung Electro-Mechanics Co., Ltd., Suwon-Si, Gyeonggi-Do [KR]
Rensselaer Polytechnic Institute, Troy, NY (US)

Signed and Sealed this
Fourth Day of September, 2012

David J. Kappos
*Director of the United States Patent and Trademark Office*